(12) United States Patent
Chande et al.

(10) Patent No.: US 12,028,733 B2
(45) Date of Patent: Jul. 2, 2024

(54) LONG-TERM-SENSING-BASED INTER-OPERATOR COEXISTENCE TECHNIQUES FOR UNLICENSED HIGH FREQUENCY BANDS

(71) Applicant: QUALCOMM Incorporated, San Diego, CA (US)

(72) Inventors: Vinay Chande, San Diego, CA (US); Arumugam Chendamarai Kannan, San Diego, CA (US); Jing Sun, San Diego, CA (US); Xiaoxia Zhang, San Diego, CA (US); Aleksandar Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 202 days.

(21) Appl. No.: 17/472,342

(22) Filed: Sep. 10, 2021

(65) Prior Publication Data

US 2022/0078640 A1 Mar. 10, 2022

Related U.S. Application Data

(60) Provisional application No. 63/076,898, filed on Sep. 10, 2020.

(51) Int. Cl.
*H04W 24/10* (2009.01)
*H04B 17/318* (2015.01)
*H04W 24/04* (2009.01)
*H04W 84/04* (2009.01)
*H04W 84/12* (2009.01)

(52) U.S. Cl.
CPC .......... *H04W 24/10* (2013.01); *H04B 17/318* (2015.01); *H04W 24/04* (2013.01); *H04W 84/042* (2013.01); *H04W 84/12* (2013.01)

(58) Field of Classification Search
CPC .................................................... H04W 24/10
See application file for complete search history.

(56) References Cited

U.S. PATENT DOCUMENTS

| | | | |
|---|---|---|---|
| 2016/0007350 A1* | 1/2016 | Xiong | H04W 24/10 370/252 |
| 2017/0325241 A1* | 11/2017 | Toskala | H04W 72/541 |
| 2018/0124622 A1* | 5/2018 | Van Der Velde | H04B 17/345 |

(Continued)

*Primary Examiner* — Jason E Mattis
(74) *Attorney, Agent, or Firm* — Arun Swain; ArentFox Schiff LLP

(57) ABSTRACT

This disclosure provides systems, methods and apparatus, including computer programs encoded on computer storage media, related to long-term-sensing-based inter-operator coexistence techniques for unlicensed high bands providing a measurement framework and candidate measurements, along with channel selection, per beam channel deselection, and dynamic frequency selection. In one aspect, a network entity may determine that a non-coordinating node satisfies a communication presence threshold based on the at least one long term sensing measurement, and transmitting, to a user equipment (UE), an indication of a remedial action, or adjusting the communication channel based on the determination. In another aspect, a UE may obtain at least one long term sensing measurement, and transmit a long term sensing report including the at least one long term sensing measurement.

28 Claims, 10 Drawing Sheets

(56) References Cited

U.S. PATENT DOCUMENTS

| | | | | |
|---|---|---|---|---|
| 2018/0338335 | A1* | 11/2018 | Mukherjee | H04L 27/0006 |
| 2019/0363969 | A1* | 11/2019 | Omar | H04W 24/10 |
| 2021/0243788 | A1* | 8/2021 | Murayama | H04W 16/28 |
| 2022/0286191 | A1* | 9/2022 | Wei | H04L 5/001 |
| 2023/0217492 | A1* | 7/2023 | Garcia Rodriguez | H04W 74/0816 |
| | | | | 370/329 |

* cited by examiner

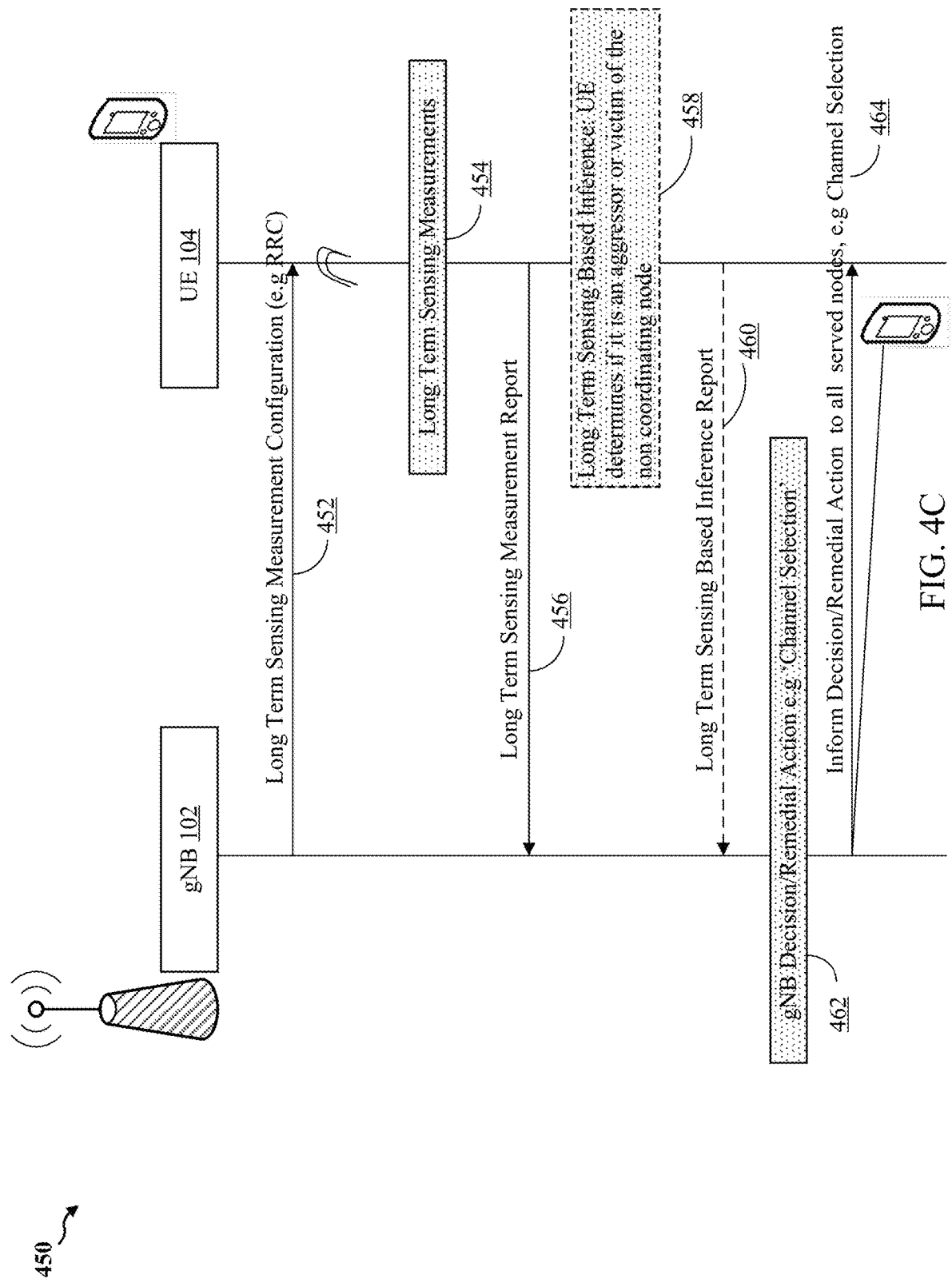

LONG-TERM-SENSING-BASED INTER-OPERATOR COEXISTENCE TECHNIQUES FOR UNLICENSED HIGH FREQUENCY BANDS

CROSS-REFERENCE TO RELATED APPLICATION(S)

This application claims the benefit of U.S. Provisional Patent Application No. 63/076,898, entitled "TECHNIQUES FOR LONG TERM SENSING BASED INTER-OPERATOR COEXISTENCE TECHNIQUES FOR UNLICENSED HIGH FREQUENCY BANDS" and filed on Sep. 10, 2020, which is expressly incorporated by reference herein in its entirety.

TECHNICAL FIELD

Aspects of the present disclosure relate generally to wireless communication systems, and more particularly, to long-term-sensing-based inter-operator coexistence techniques for unlicensed high frequency bands.

DESCRIPTION OF THE RELATED TECHNOLOGY

Wireless communication systems are widely deployed to provide various types of communication content such as voice, video, packet data, messaging, broadcast, and so on. These systems may be multiple-access systems capable of supporting communication with multiple users by sharing the available system resources (such as time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as NR) is envisaged to expand and support diverse usage scenarios and applications with respect to current mobile network generations. In some aspects, 5G communications technology can include: enhanced mobile broadband (eMBB) addressing human-centric use cases for access to multimedia content, services and data; ultra-reliable-low latency communications (URLLC) with certain specifications for latency and reliability; and massive machine type communications (mMTC), which can allow a very large number of connected devices and transmission of a relatively low volume of non-delay-sensitive information.

For example, in wireless communication systems, a user equipment (UE) may be in communication with, or connected to two or more nodes. One node may be a network entity such as a gNB and the other may be a wireless local area network (WLAN) node such as a WiGig-capable node. In such a scenario, the WLAN node may correspond to a non-coordinating node due to the lack of communication and coordination between the WLAN node and the network entity to mitigate potential communication degradations such as interference on a particular frequency band.

In some examples, various nodes may utilize New Radio (NR) technologies in an unlicensed high frequency band spectrum. The unlicensed spectrum of the 60 GHz or other high frequency band may permit a deployment of nodes with a wide variety of bandwidths, for example, with a total spectrum size of roughly 14 GHz. Such nodes may utilize beamforming to transmit directional communications. While beamforming may help reduce interference in some lower frequency bands, due to the presence of multiple beams transmitted by multiple nodes in higher frequency bands, interference may still occur and result in beam collisions. Additionally, as a result of the high directionality of the beams and the short range of transmissions, the level or impact of such interference when it does occur may be severe.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication at an apparatus of a user equipment (UE). The method may include receiving, from a network entity, a sensing measurement configuration message. The method may further include transmitting, to the network entity, a long-term-sensing-based report including the at least one long term sensing measurement obtained during a sensing period at the UE and associated with at least one non-coordinating node that forgoes coordination with a node within a coverage area, the long-term-sensing-based report indicating an interference impact on the at least one non-coordinating node. The method may further include receiving, from the network entity, an indication of a remedial action.

A further example of the subject matter described in this disclosure can be implemented at an apparatus for wireless communications including a memory and at least one processor coupled to the memory. The at least one processor may be configured to receive, from a network entity, a sensing measurement configuration message. The at least one processor may further be configured to transmit, to the network entity, a long-term-sensing-based report including the at least one long term sensing measurement obtained during a sensing period at the UE and associated with at least one non-coordinating node that forgoes coordination with a node within a coverage area, the long-term-sensing-based report indicating an interference impact on the at least one non-coordinating node. The at least one processor may further be configured to receive, from the network entity, an indication of a remedial action.

An additional example of the subject matter described in this disclosure can be implemented at an apparatus for wireless communications including means for receiving, from a network entity, a sensing measurement configuration message. The apparatus may further include means for transmitting, to the network entity, a long-term-sensing-based report including the at least one long term sensing measurement obtained during a sensing period at the UE and associated with at least one non-coordinating node that forgoes coordination with a node within a coverage area, the long-term-sensing-based report indicating an interference impact on the at least one non-coordinating node. The apparatus may further include means for receiving, from the network entity, an indication of a remedial action.

A further example of the subject matter described in this disclosure can be implemented at a computer-readable medium storing computer executable code, the code when executed by a processor cause the processor to receive, from a network entity, a sensing measurement configuration message, transmit, to the network entity, a long-term-sensing-based report including the at least one long term sensing measurement obtained during a sensing period at the UE and associated with at least one non-coordinating node that forgoes coordination with a node within a coverage area, the long-term-sensing-based report indicating an interference impact on the at least one non-coordinating node, and receive, from the network entity, an indication of a remedial action.

Another innovative aspect of the subject matter described in this disclosure can be implemented in a method of wireless communication at an apparatus of a network entity. The method may include obtaining at least one long term sensing measurement associated with at least one non-coordinating node that forgoes coordination with a node within a coverage area. The method may further include identifying that the at least one non-coordinating node satisfies a communication presence threshold indicating medium access interference experienced by the at least one non-coordinating node based on the at least one long term sensing measurement. The method may further include transmitting, to a user equipment (UE), an indication of a remedial action.

A further example of the subject matter described in this disclosure can be implemented at an apparatus for wireless communications including a memory and at least one processor coupled to the memory. The at least one processor may be configured to obtain at least one long term sensing measurement associated with at least one non-coordinating node that forgoes coordination with a node within a coverage area. The at least one processor may further be configured to identify that the at least one non-coordinating node satisfies a communication presence threshold indicating medium access interference experienced by the at least one non-coordinating node based on the at least one long term sensing measurement. The at least one processor may further be configured to transmit, to a UE, an indication of a remedial action.

An additional example of the subject matter described in this disclosure can be implemented at an apparatus for wireless communications including means for obtaining at least one long term sensing measurement associated with at least one non-coordinating node that forgoes coordination with a node within a coverage area. The apparatus may further include means for identifying that the at least one non-coordinating node satisfies a communication presence threshold indicating medium access interference experienced by the at least one non-coordinating node based on the at least one long term sensing measurement. The apparatus may further include means for transmitting, to a user equipment (UE), an indication of a remedial action.

A further example of the subject matter described in this disclosure can be implemented at a computer-readable medium storing computer executable code, the code when executed by a processor cause the processor to obtain at least one long term sensing measurement associated with at least one non-coordinating node that forgoes coordination with a node within a coverage area, identify that the at least one non-coordinating node satisfies a communication presence threshold indicating medium access interference experienced by the at least one non-coordinating node based on the at least one long term sensing measurement, and transmit, to a UE, an indication of a remedial action.

Another innovative aspect of the subject matter described in this disclosure can be implemented in a method of wireless communication at an apparatus of a network entity. The method may include obtaining at least one long term sensing measurement associated with a non-coordinating node that forgoes coordination with a node within a coverage area. The method may further include identifying that the non-coordinating node satisfies a communication presence threshold indicating medium access interference experienced by the non-coordinating node on a communication channel based on the at least one long term sensing measurement. The method may further include adjusting the communication channel to mitigate interference with the non-coordinating node based on the non-coordinating node satisfying the communication presence threshold.

A further example of the subject matter described in this disclosure can be implemented at an apparatus for wireless communications including a memory and at least one processor coupled to the memory. The at least one processor may be configured to obtain at least one long term sensing measurement associated with a non-coordinating node that forgoes coordination with a node within a coverage area. The at least one processor may be configured to identify that the non-coordinating node satisfies a communication presence threshold indicating medium access interference experienced by the non-coordinating node on a communication channel based on the at least one long term sensing measurement. The at least one processor may be configured to adjust the communication channel to mitigate interference with the non-coordinating node based on the non-coordinating node satisfying the communication presence threshold.

An additional example of the subject matter described in this disclosure can be implemented at an apparatus for wireless communications including means for obtaining at least one long term sensing measurement associated with a non-coordinating node that forgoes coordination with a node within a coverage area. The apparatus may further include means for identifying that the non-coordinating node satisfies a communication presence threshold indicating medium access interference experienced by the non-coordinating node on a communication channel based on the at least one long term sensing measurement. The apparatus may further include means for adjusting the communication channel to mitigate interference with the non-coordinating node based on the non-coordinating node satisfying the communication presence threshold.

A further example of the subject matter described in this disclosure can be implemented at a computer-readable medium storing computer executable code, the code when executed by a processor cause the processor to obtain at least one long term sensing measurement associated with a non-coordinating node that forgoes coordination with a node within a coverage area. The computer-readable medium further including code when executed by a processor cause the processor to identify that the non-coordinating node satisfies a communication presence threshold indicating medium access interference experienced by the non-coordinating node on a communication channel based on the at least one long term sensing measurement. The computer-readable medium further including code when executed by a processor cause the processor to adjust the communication channel to mitigate interference with the non-coordinating node based on the non-coordinating node satisfying the communication presence threshold.

Details of one or more aspects of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 4C is a flow diagram for UE assisted long term sensing that supports cooperation between UEs, coordinating nodes, and non-coordinating nodes in high frequency bands.

Like reference numbers and designations in the various drawings indicate like elements.

DETAILED DESCRIPTION

Figure 1:
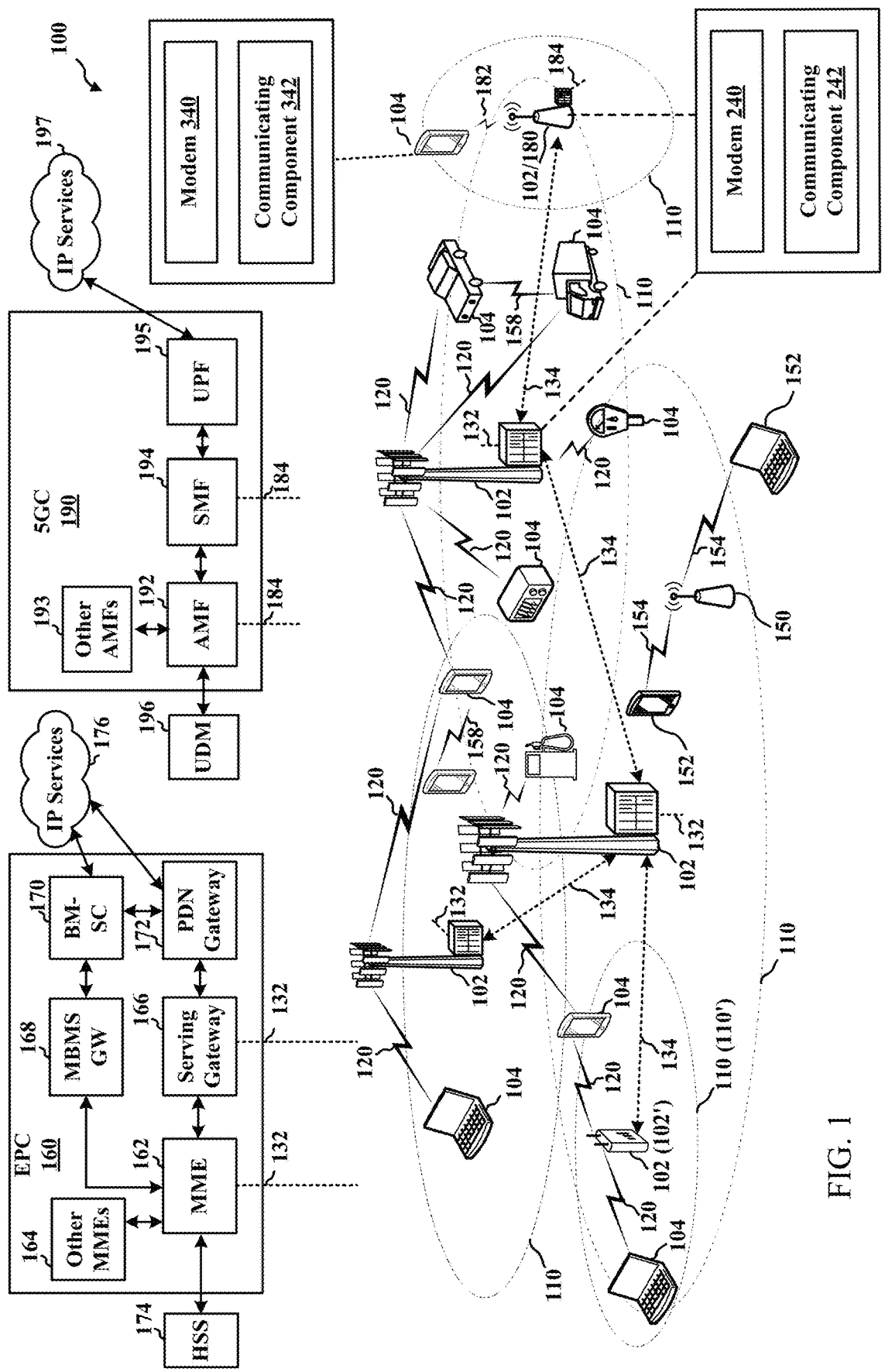
FIG. 1 illustrates an example of a wireless communication system.

The following description is directed to certain aspects for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described aspects may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further aspects thereof, technology.

To avoid or mitigate interference to and from other non-coordinating nodes such as nodes operating on different radio access technologies (RATs), technology types, or operators, coexistence techniques among these different nodes may be implemented. Coordinating nodes having overlapping or otherwise adjacent coverage areas may communicate with each other to manage inter-operability. Non-coordinating nodes, on the other hand, may not communicate with at least one other node within a proximate coverage area. Some examples of coexistence techniques include listen before talk (LBT) or dynamic frequency selection to avoid interference with radar. Another example coexistence technique is long term sensing, which may be implemented at a slower timescale compared to LBT sensing, and which may facilitate detection and resolution of beam-collision scenarios with strong interference.

Aspects of the present disclosure generally relate to long-term-sensing-based inter-operator coexistence techniques. Inter-operator coexistence techniques may relate to network entities not operating within or not using a common operator. Some aspects are particularly suited for operation in unlicensed high frequency bands. Specifically, in some aspects, the disclosure provides a measurement framework and candidate measurements for improved coexistence between coordinating and non-coordinating nodes. In some such aspects, using the long term sensing framework, the presence of affected non-coordinating nodes may be identified based on long term sensing measurements, with the affected non-coordinating nodes exhibiting degraded channel conditions. The long term sensing framework may further provide coexistence in a higher frequency band unlicensed spectrum where measurements and inferences performed at the gNB and at the UE are used to facilitate coexistence with non-coordinating nodes. These measurements are designed to assess impact to and from non-coordinating nodes, potentially belonging to NR, WiGig or other technologies. Further, the measurements may be grouped such that they take into account directionality of measurements as well as directionality of the intended transmissions.

The long term sensing framework may also identify remedial actions to resolve the degraded or degrading channel conditions. For example, the framework may provide techniques for adjusting a channel or set of frequencies used by a gNB or served UEs, based on detection of affected non-coordinating nodes by long term sensing. Further, the determination to use or not use the channel may potentially be made on a per-beam basis. A channel may represent an entity such as a component carrier, active or configured BWP coverage under an SSB. In some other aspects, the disclosure provides coexistence techniques including channel selection, per-beam-channel deselection, and dynamic frequency selection. In some such aspects, using the long term sensing framework, a gNB or a serving UE may adjust a channel or set of frequencies that correspond to a component carrier, a channel bandwidth, or a bandwidth part (BWP) based on detection of affected non-coordinating nodes by long term sensing measurements.

Particular implementations of the subject matter described in this disclosure can be implemented to realize one or more of the following potential advantages. The disclosed techniques enable coexistence in unlicensed high frequency bands between various non-coordinated nodes. Specifically, the techniques described herein may provide a flexible approach than enables a network entity, a UE, or both working in tandem, to facilitate interference reduction based on long term sensing measurements.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, or a computer. By way of illustration, both an application running on a computing device and the computing device can be a component. One or more components can reside within a process or thread of execution and a component can be localized on one computer or distributed between two or more computers. In addition, these components can execute from various computer readable media having various data structures stored thereon. The components can communicate by way of local or remote processes such as in accordance with a signal having one or more data packets, such as data from one component interacting with another component in a local system, distributed system, or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (such as LTE) communications over a shared radio frequency spectrum band. The description below, however, describes an LTE/LTE-A system for purposes of example, and LTE terminology is used in much of the description below, although the techniques are applicable beyond LTE/LTE-A applications (such as to fifth generation (5G) NR networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. or may not include all of the devices, components, modules etc. discussed in connection with the figures. A combination of these approaches also can be used.

FIG. 1 illustrates an example of a wireless communication system. The wireless communications system (also referred to as a wireless wide area network (WWAN)), includes an access network 100, base stations 102, UEs 104, an Evolved Packet Core (EPC) 160, or a 5G Core (5GC) 190. The base stations 102, which also may be referred to as network entities, may include macro cells (high power cellular base station) or small cells (low power cellular base station). The macro cells can include base stations. The small cells can include femtocells, picocells, and microcells. In an example, the base stations 102 also may include or otherwise correspond to gNBs 180. Further, in some aspects, the base stations 102 may each include multiple TRPs.

In one example, some nodes such as base station (BS) 102/gNB 180, may have a modem 240 and communicating component 242 for obtaining long term sensing measurements, identifying that a non-coordinating node satisfies a communication presence threshold based on the long term sensing measurements, transmit a remedial action to the UE 104, and adjust a communication channel based on identifying that the non-coordinating node satisfies a communication presence threshold, as described herein. Though a base station 102/gNB 180 is shown as having the modem 240 and communicating component 242, this is one illustrative example, and substantially any node may include a modem 240 and communicating component 242 for providing corresponding functionalities described herein.

In another example, some nodes such as UE 104 of the wireless communication system may have a modem 340 and communicating component 342 for receiving a long term sensing measurement configuration message, obtaining, during a sensing period at the UE 104, at least one long term sensing measurement in response to receiving the long term sensing measurement configuration message, transmitting a long-term-sensing-based report including the at least one long term sensing measurement, and receiving an indication including a remedial action, as described herein. Though a UE 104 is shown as having the modem 340 and communicating component 342, this is one illustrative example, and substantially any node or type of node may include a modem 340 and communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (such as using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or 5GC 190) with each other over backhaul links 134 (such as using an X2 interface). The backhaul links 132, 134 or 184 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network also may include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (such as for x component carriers) used for transmission in the DL or the UL direction. The carriers may or may not be adjacent to each other. Allocation of carriers may be asymmetric with respect to DL and UL (such as more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station, which may correspond to gNB 180, may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (such as from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, or other IP services.

The base station also may be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (such as satellite, terrestrial), a multimedia device, a video device, a digital audio player (such as MP3 player), a camera, a game console, a tablet, a smart device, robots, drones, an industrial/manufacturing device, a wearable device (such as a smart watch, smart clothing, smart glasses, virtual reality goggles, a smart wristband, smart jewelry (such as a smart ring, a smart bracelet)), a vehicle/a vehicular device, a meter (such as parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (such as meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 4A:
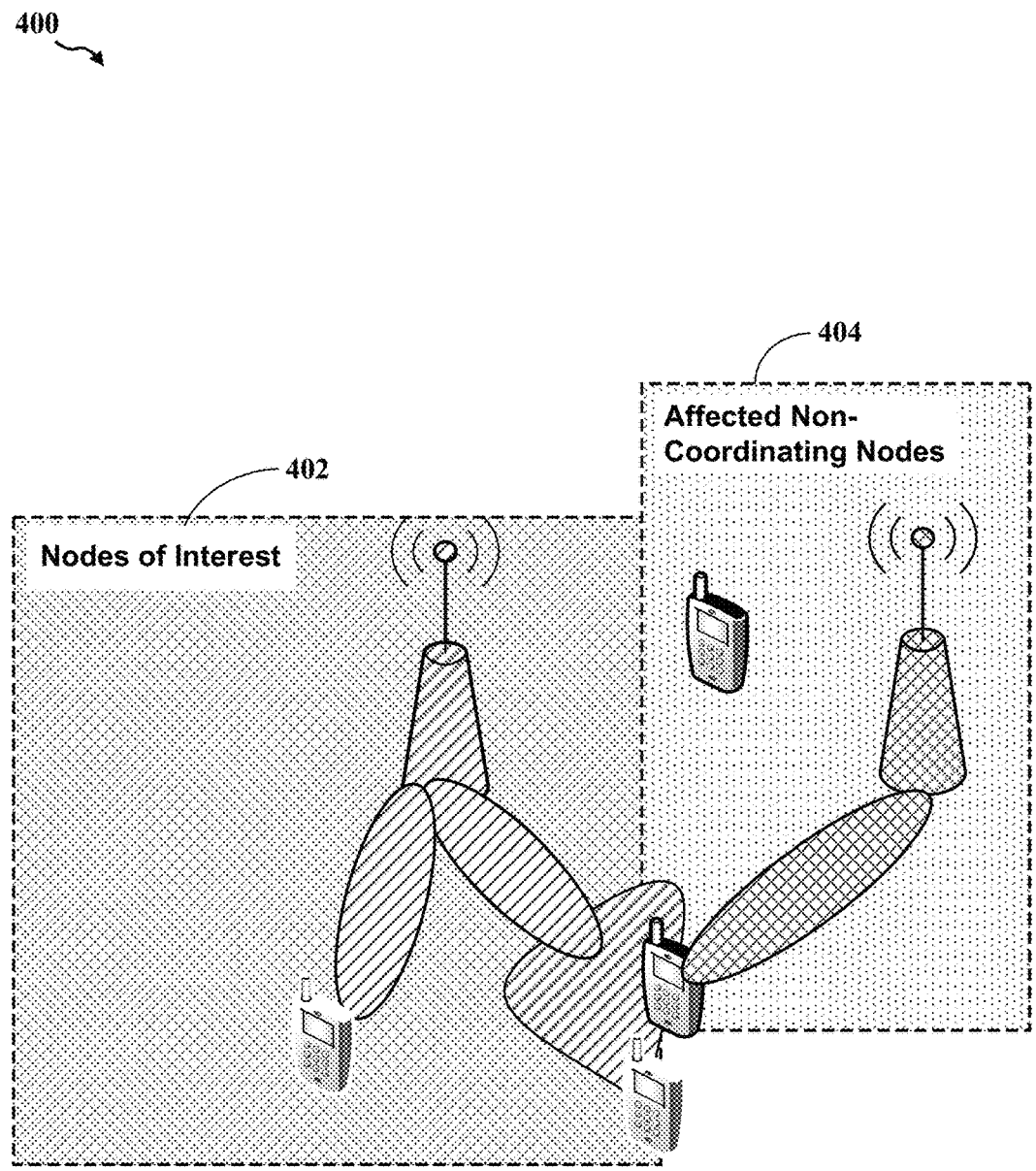
FIG. 4A illustrates an example communication scenario between nodes of interest and non-coordinating nodes.
Figure 4B:
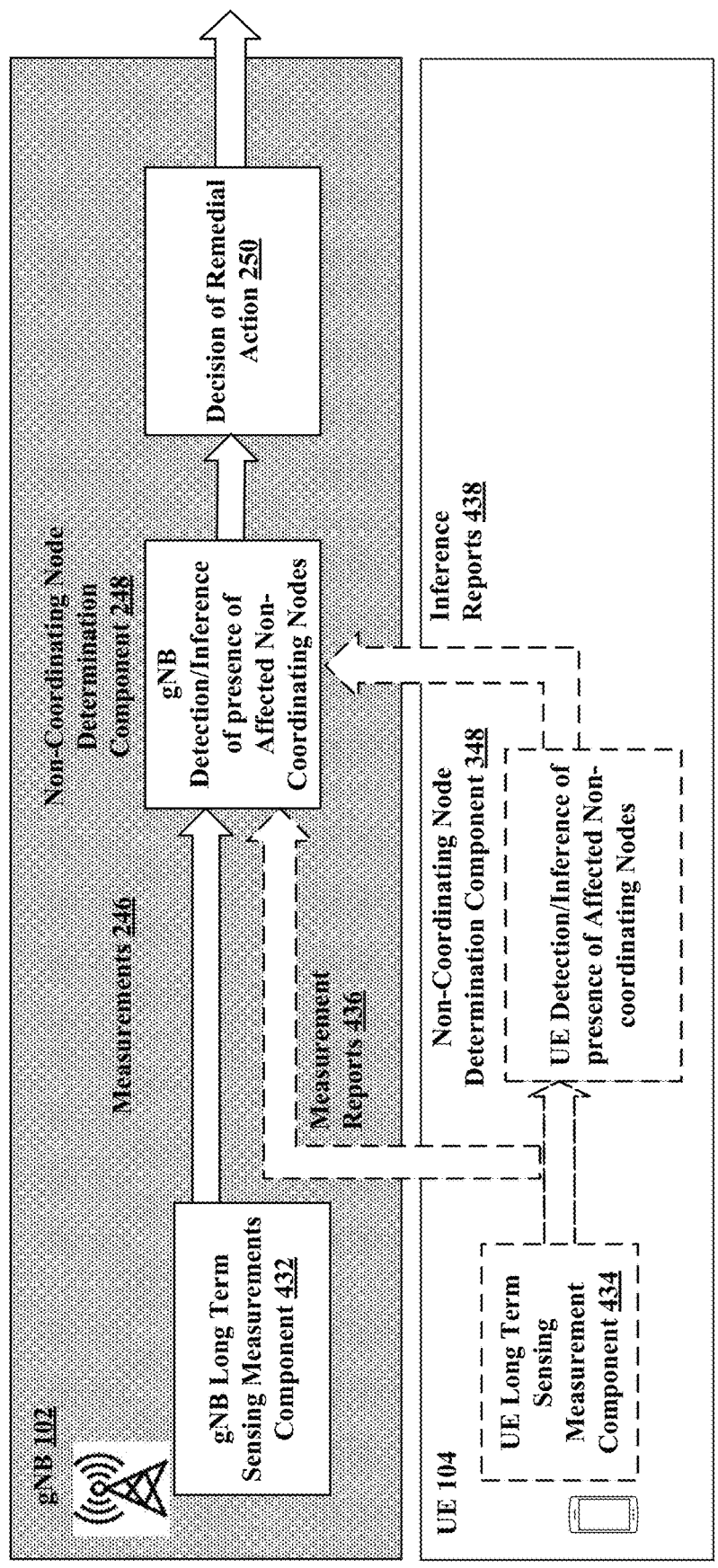
FIG. 4B is a conceptual diagram of a long-term-sensing-based coexistence framework that supports cooperation between UEs, coordinating nodes, and non-coordinating nodes in high frequency bands.
Figure 5:
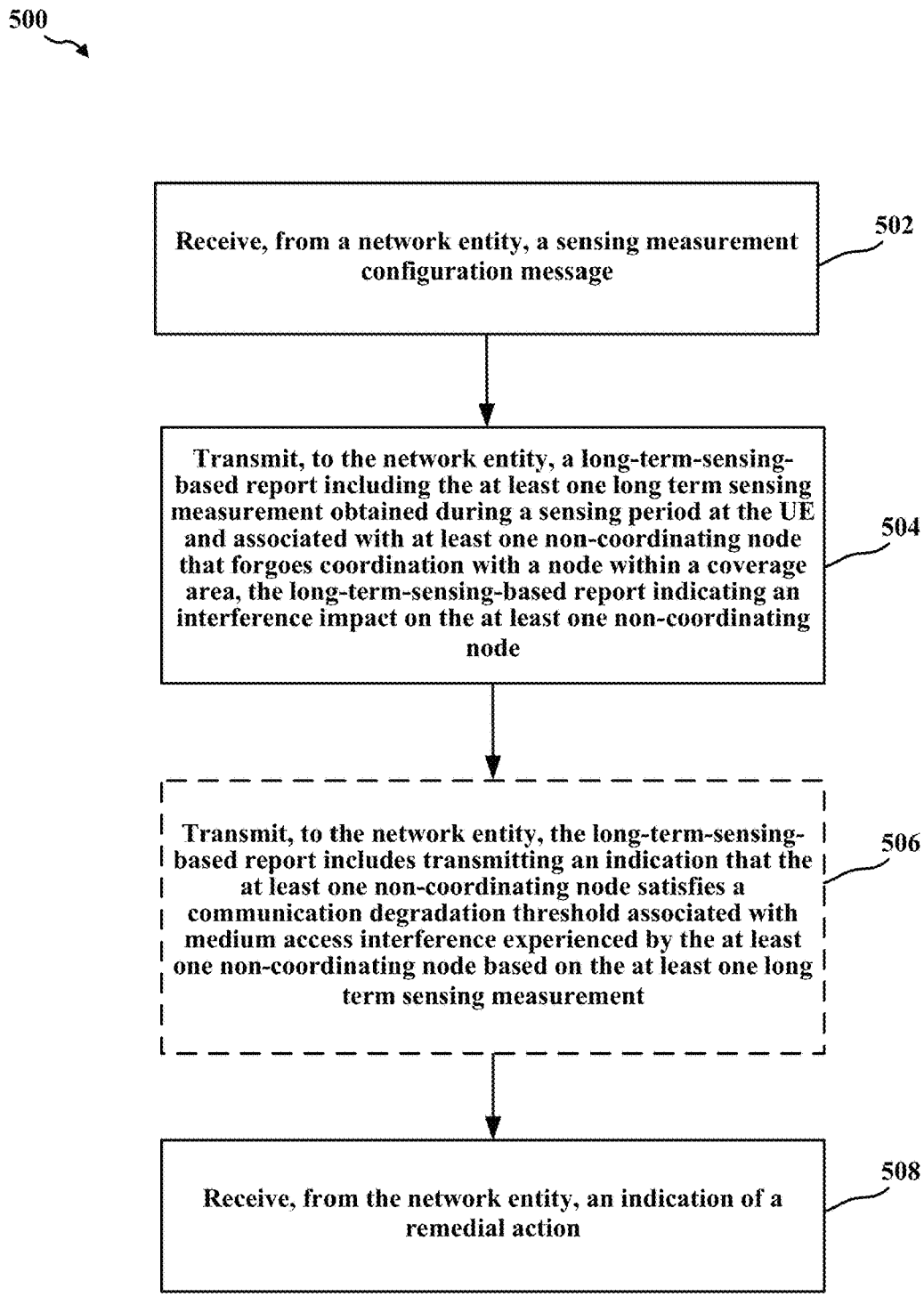
FIG. 5 is a flowchart of an example method of wireless communication at a UE that supports cooperation between UEs, coordinating nodes, and non-coordinating nodes in high frequency bands.

Turning now to FIGS. 2-7, aspects are depicted with reference to one or more components and one or more methods that may perform the actions or operations described herein, where aspects in dashed line may be optional. Although the operations described below in FIGS. 5, 6A, and 6B are presented in a particular order or as being performed by an example component, it should be understood that the ordering of the actions and the components performing the actions may be varied, depending on the implementation. Moreover, it should be understood that the following actions, functions, or described components may be performed by a specially-programmed processor, a processor executing specially-programmed software or computer-readable media, or by any other combination of a hardware component or a software component capable of performing the described actions or functions.

Figure 2:
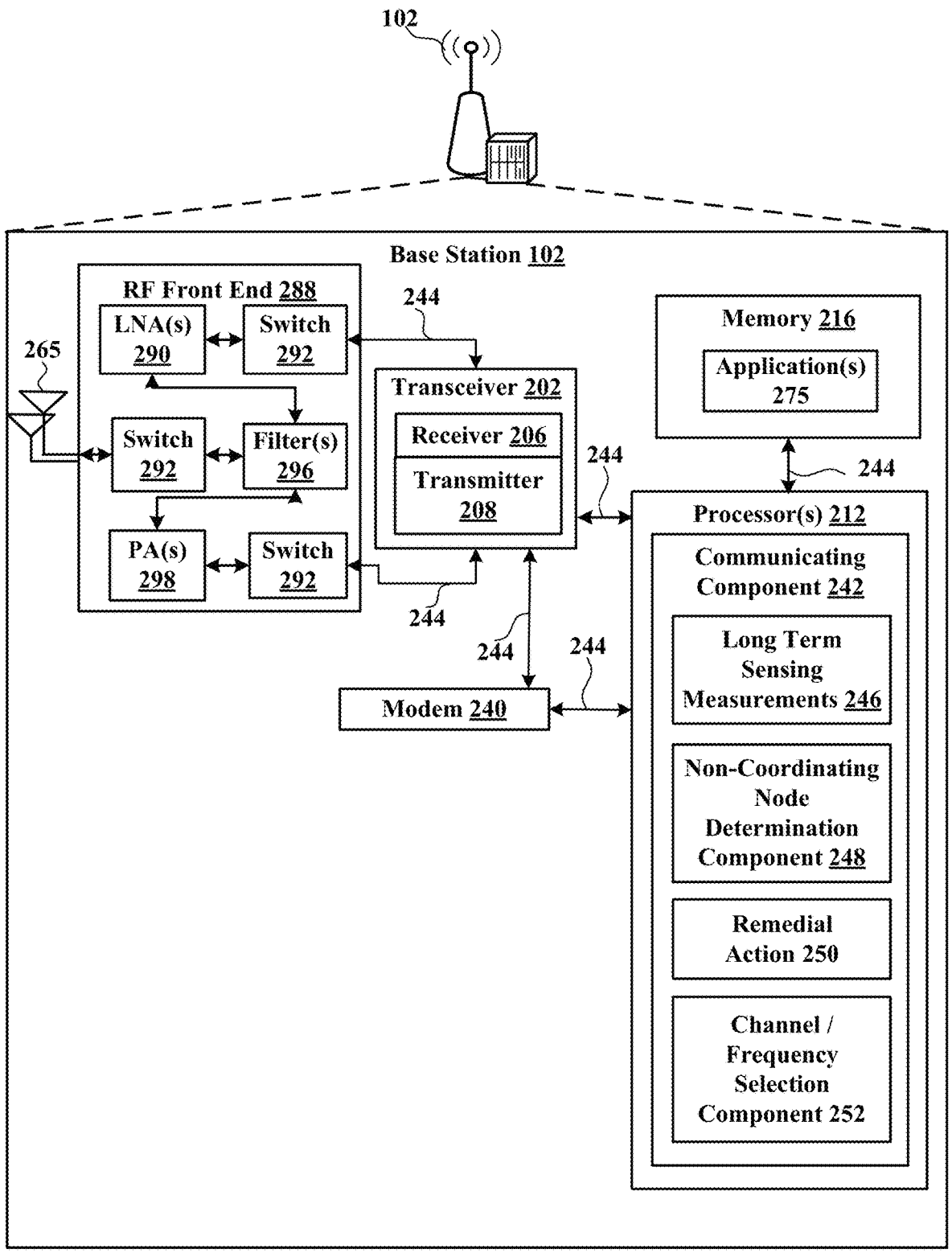
FIG. 2 is a block diagram illustrating an example of a network entity.

FIG. 2 is a block diagram illustrating an example of a network entity (also referred to as a base station (BS) that may have multiple TRPs). The base station 102 (such as a base station 102 or gNB 180, as described above) may include a variety of components, some of which have already been described above and are described further herein, including components such as one or more processors 212 and memory 216 and transceiver 202 in communication via one or more buses 244, which may operate in conjunction with modem 240 or communicating component 242 for providing long-term-sensing-based inter-operator coexistence, for example, in an unlicensed high band spectrum.

Specifically, to identify affected non-coordinating nodes, long term sensing measurements 246 at the base station 102 may be input to the non-coordinating node determination component 248, which may be configured to determine or otherwise identify whether there are non-coordinated nodes that are affected. That is, the non-coordinating node determination component 248 may determine or otherwise identify that a non-coordinating node satisfies a communication presence threshold based on the long term sensing measurements 246. As such, satisfaction of the communication presence threshold may indicate affected non-coordinating nodes, which may be potential victims of transmissions from the gNB or the UE. In other words, a non-coordinating node may be identified as affected if communication from one or both of the base station 102 or the UE 104 negatively impacts channel conditions of a non-coordinated node. The communication presence threshold may also be indicative of a non-coordinated node whose medium access, or ability to occupy the medium, may be adversely affected by the base station 102 or the UE 104 performing the long term sensing measurements 246.

For example, the long term sensing measurements 246 may be inputs to the non-coordinating node determination component 248, which detects the presence of affected non-coordinating nodes within a network. In some aspects, the base station 102 may obtain the long term sensing measurements 246 directly or via the UE 104. In a direct approach, the base station 102 acquires the long term sensing measurements 246 without assistance from another entity such as the UE 104. The UE 104 may be configured by the base station 102 to acquire and report the long term sensing measurements 246 to determine or otherwise identify whether there are non-coordinating NR nodes. The base station 102 may determine the presence of non-coordinating nodes that may experience negative impacts based on the long term measurements 246, or of the non-coordinating nodes that are already known to the base station 102, which of those may be negatively impacted. Further, based on the long term measurements 246, the base station 102 may determine or otherwise identify that the non-coordinating node can create interference exceeding a threshold to the communication link. That is, the base station 102 may determine that the non-coordinating node is creating or causing interference and hence is affecting the network or link performing the long term sensing. In other words, the non-coordinating node may be determined to be the aggressor and not the victim.

The long term sensing measurements 246 may include a public mobile land network (PLMN) identifier of another network such as an NR network, an operating channel bandwidth of the other network, a frequency range of the other network, system information of the other network, UE radio resource control (RRC) idle inter-frequency and intra-frequency measurements, or UE RRC inactive inter-frequency and intra-frequency measurements. Examples of the aforementioned measurements may include RRC_IDLE, RRC_INACTIVE, or RRC_ACTIVE. In some aspects, another network may be a network distinct from a network associated with the base station 102. Further, the RRC idle and RRC inactive measurements may correspond to synchronization signal reference signal receive power (SS-RSRP) or secondary synchronization reference signal receive quality (SS-RSRQ). In some aspects, the UE 104 may be requested by the base station 104 to obtain the long term sensing measurements 246 while in an RRC connected state.

Additionally, the base station 102, via the communicating component 242, may transmit a measurement configuration message to the UE 104 for long term sensing. The measurement configuration message may trigger the UE to perform the long term sensing measurements 246 on a communication channel associated with a non-coordinating node. The base station 102 may further configure the UE 104 to obtain the long term sensing measurements 246 and provide quantitative reporting according to a beam associated with quasi-co-location (QCL) or receive spatial filter information. For instance, the base station 102 may receive a long term sensing report, from the UE 104, including at least one identified beam used to perform the long term sensing measurements 246. The base station 104 may also measure the energy during the long term sensing opportunities. In some aspects, the energy may be measured with a configured beam, or by using a specific choice of QCL or receive spatial filter which can be used for grouping the measurements. An energy level may obtained by baseband measurements such as a received signal strength indicator (RSSI), a scaling received reference signal power (RSRP) of a reference signal, or a radio frequency measurements after an analog to digital conversion In an example, the non-coordinating node component 248 may determine or otherwise identify that the affected non-coordinating node corresponds to a WLAN node, which may operate according to WiGig—802.11ad or 802.11ay. The base station 102 may measure and decode signals from the WLAN node residing in or otherwise forming a WiGig network. Specifically, the base station 102 may obtain beacons of other network access points (APs), determine the channelization, determine the bandwidth, or determine a relative signal strength. The WiGig measurements may be performed using configured beams such that QCL or receive spatial filter information is reported with the beam.

The base station 102 may further maintain or otherwise store samples of transmission measured during a sensing period. Such sampling can be done at the radio frequency analog-to-digital converter stage, intermediate frequency stage or at the baseband. The transmission samples may be used to determine a presence of WiGig preambles for potential offline processing. In some aspects, offline processing may determine transmission content as well as a received signal strength indicator (RSSI). The transmissions may be sampled using configured beams such that QCL or receive spatial filter information is reported with the beam.

Communicating component 242 may further include a remedial action 250, which may include a request or instruction for a receiving entity such as the UE 104 to undertake in order to mitigate poor channel conditions for the non-coordinating node. For instance, the remedial action 250 may include a channel selection parameter triggering the UE 104 to select a different channel. In another example, a remedial action 250 may correspond to a reduction in transmit power to meet a signal-to-interference and noise ratio (SINR) or related quality metric at a served node such as the base station 102 or UE 104. A further example of a remedial action 250 may include a reduction in transmit power to keep an interference level below a threshold at the non-coordinating node.

In a further example, a remedial action 250 may correspond to a reduction of transmit powers when using certain beams. An additional example of a remedial action 250 may include determining or otherwise identifying a duration or time interval when other long term nodes are listening and transmitting a jamming or reservation signal at those durations. In another example, over the air or over wired back-haul messages may be broadcasted to the coordinating node indicating the presence and strength of non-coordinating node. In yet another example, a duty cycle of the transmission may be changed, with or without restrictions on the beams where the duty cycle is reduced. Another example may include changing long term sensing parameters at the sensing entity or served nodes. A further example may include changing from a long term sensing to short term sensing framework.

In a further aspect, communicating component 242 may include channel and frequency selection component 252, which may be configured to perform channel selection, per beam channel deselection, or dynamic frequency selection for long-term-sensing-based inter-operator coexistence in unlicensed high bands. For example, using information relating to the affected non-coordinated nodes, which may be determined based on signal or interference strengths of the long term sensing measurements 246, and the grouping of beams used for the long term sensing measurements 246, channel selection, per beam channel deselection, or dynamic frequency selection may be performed by the channel and frequency selection component 252.

The long term sensing measurements 246 may further include a bandwidth or channels occupied by the affected non-coordinating nodes. For example, if the non-coordinating node is an NR node, the bandwidth or channel occupied by the affected non-coordinating node may be the operating channel bandwidth. Further, if the non-coordination node is a WiGig node, the bandwidth or channel occupied by the affected non-coordinating node may be the start and end of the occupied 2.16 GHz channels. The long term sensing measurements 246 may further include an identity of a set of beams from the base station 102 or UE 104 that affect the non-coordinating nodes. For instance, the identity of a set of beams may correspond to synchronization signal block (SSB) indices, QCL information of the interfering or aggressor beams, or UE transmit beams.

In one aspect, based on determining or otherwise identifying the presence of an affected non-coordinating node by the non-coordinating node determination component 248, the channel and frequency selection component 252 may select a channel other than the channel affecting the non-coordinating node and direct some or all UEs to switch to the new channel. In another aspect, based on determining the presence of an affected non-coordinating node by the non-coordinating node determination component 248 and that the bandwidth set of frequencies occupied by the affected non-coordinating node, the channel and frequency selection component 252 may select a new channel that does not overlap with select a channel other than the bandwidth set of frequencies occupied by the affected non-coordinating node.

In a further aspect, based on determining or otherwise identifying the presence of an affected non-coordinating node by the non-coordinating node determination component 248, and if the base station 102 has deployed more than one component carriers and if the base station 102 cannot switch to a carrier to another channel (e.g., due to unavailability or radio frequency limitations), the base station 102 may turn off operation in the affecting carrier.

Additionally, the channel and frequency selection component 252 may determine the beams along which the non-coordinating nodes are affected. Based on determining the beams, the channel and frequency selection component 252 may turn off the SSBs covering beams that affect the non-coordinating nodes according to a per beam channel deselection basis.

The channel and frequency selection component 252 may identify the bandwidth part (BWP) where the UE 104 or base station 102 transmission affect the non-coordinating node. In one implementation, the base station 102 may change the active BWP for the UE 104. In another implementation, the base station 102 may remove the BWP from the configured set of BWPs for the UE 104. In addition to identifying the BWP where the UE 104 or base station 102 transmission affect the non-coordinating node, channel and frequency selection component 252 may change the active BWP to be outside the bandwidth, or remove some or all BWPs overlapping with the bandwidth or set of frequencies occupied by the affected non-coordinating node from the configured set of BWPs for the UE 104 based on identifying that the bandwidth occupied by the configured set of BWPs for the UE 104.

In some aspects, the one or more processors 212 can include a modem 240 or can be part of the modem 240 that uses one or more modem processors. Thus, the various functions related to communicating component 242 may be included in modem 240 or processors 212 and, in some aspects, can be executed by a single processor, while in other aspects, different ones of the functions may be executed by a combination of two or more different processors. For example, in some aspects, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 or modem 240 associated with communicating component 242 may be performed by transceiver 202.

Also, memory 216 may be configured to store data used herein or local versions of applications 275 or communicating component 242 or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In some aspects, for example, memory 216 may be a non-transitory computer-readable storage medium that stores one or more computer-executable codes defining communicating component 242 or one or more of its subcomponents, or data associated therewith, when base station 102 is operating at least one processor 212 to execute communicating component 242 or one or more of its subcomponents.

Transceiver 202 may include at least one receiver 206 and at least one transmitter 208. Receiver 206 may include hardware or software executable by a processor for receiving data, the code including instructions and being stored in a memory (such as computer-readable medium). Receiver 206 may be, for example, a radio frequency (RF) receiver. In some aspects, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware or software executable by a processor for transmitting data, the code including instructions and being stored in a memory (such as computer-readable medium). A suitable example of transmitter 208 may including, but is not limited to, an RF transmitter.

Moreover, in some aspects, base station 102 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals. The antennas 265 may include one or more antennas, antenna elements, or antenna arrays.

In some aspects, LNA 290 can amplify a received signal at a desired output level. In some aspects, each LNA 290 may have a specified minimum and maximum gain values. In some aspects, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In some aspects, each PA 298 may have specified minimum and maximum gain values. In some aspects, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in some aspects, for example, a respective filter 296 can be used to filter an output from a respective PA 298 to produce an output signal for transmission. In some aspects, each filter 296 can be connected to a specific LNA 290 or PA 298. In some aspects, RF front end 288 can use one or more switches 292 to select a transmit or receive path using a specified filter 296, LNA 290, or PA 298, based on a configuration as specified by transceiver 202 or processor 212.

As such, transceiver 202 may be configured to transmit and receive wireless signals through one or more antennas 265 via RF front end 288. In some aspects, transceiver may be tuned to operate at specified frequencies such that UE 104 can communicate with, for example, one or more base stations 102 or one or more cells associated with one or more base stations 102. In some aspects, for example, modem 240 can configure transceiver 202 to operate at a specified frequency and power level based on the UE configuration of the UE 104 and the communication protocol used by modem 240.

In some aspects, modem 240 can be a multiband-multimode modem, which can process digital data and communicate with transceiver 202 such that the digital data is sent and received using transceiver 202. In some aspects, modem 240 can be multiband and be configured to support multiple frequency bands for a specific communications protocol. In some aspects, modem 240 can be multimode and be configured to support multiple operating networks and communications protocols. In some aspects, modem 240 can control one or more components of UE 104 (such as RF front end 288, transceiver 202) to enable transmission or reception of signals from the network based on a specified modem configuration. In some aspects, the modem configuration can be based on the mode of the modem and the frequency band in use. In another aspect, the modem configuration can be based on UE configuration information associated with UE 104 as provided by the network during cell selection or cell reselection.

In some aspects, the processor(s) 212 may correspond to one or more of the processors described in connection with the UE in FIGS. 4 and 6. Similarly, the memory 216 may correspond to the memory described in connection with the UE in FIG. 7.

Figure 3:
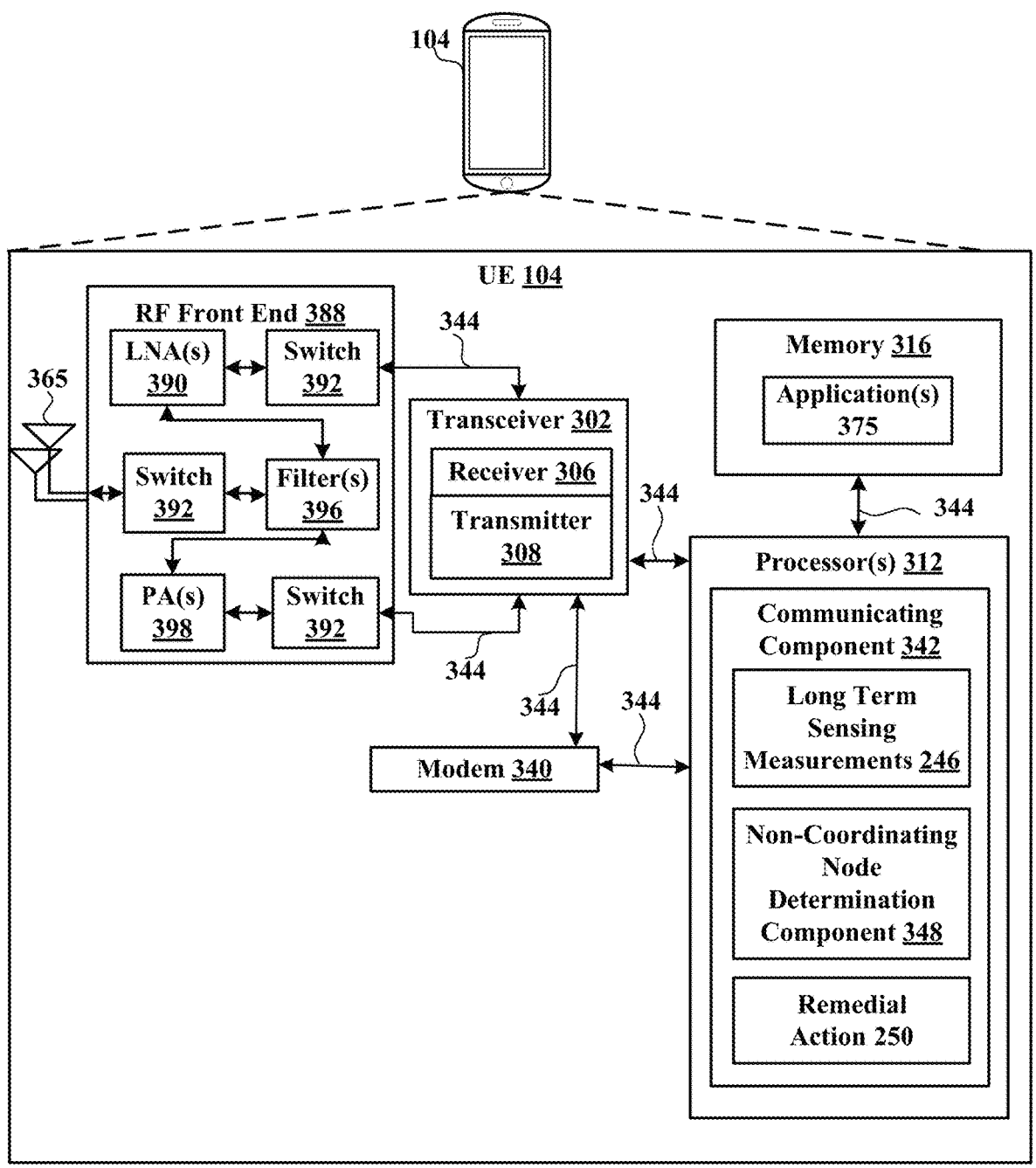
FIG. 3 is a block diagram illustrating an example of a user equipment (UE).

FIG. 3 is a block diagram illustrating an example of a user equipment (UE) 104. The UE 104 may include a variety of components, some of which have already been described above and are described further herein, including components such as one or more processors 312 and memory 316 and transceiver 302 in communication via one or more buses 344, which may operate in conjunction with modem 340 and communicating component 342 configured for long-term-sensing-based inter-operator coexistence techniques for unlicensed high bands providing a measurement framework and candidate measurements, along with channel selection, per beam channel deselection, and dynamic frequency selection.

Specifically, the communicating component 342 may include non-coordinating node determination component 348, which may be configured to determine or otherwise identify that at least one non-coordinating node satisfies a communication presence threshold based on long term sensing measurements 246, and transmitting, to the base station 102, a long-term-sensing-based report including an indication that the at least one non-coordinating node satisfies a communication degradation threshold based on the determination. The non-coordinating node determination component 348 may perform similar operations described herein as the non-coordinating node determination component 248 of the base station 102.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of base station 102, as described above, but configured or otherwise programmed for base station operations as opposed to base station operations.

In some aspects, the processor(s) 312 may correspond to one or more of the processors described in connection with the base station in FIG. 7. Similarly, the memory 316 may correspond to the memory described in connection with the base station in FIG. 7.

FIG. 4A illustrates an example communication scenario between nodes of interest 402 and non-coordinating nodes 404. For example, a UE such as UE 104 or gNB (node of interest) such as base station 102 may be in the vicinity of, interfered by, or creating interference to a non-coordinating node, when communicating with nodes of interest. One node may be a network entity such as a base station 102 and the other may be a node of another operator, radio access technology, or technology type, which may be considered a non-coordinating node. In such a scenario, the non-coordinating node may benefit from the present coexistence techniques to mitigate potential medium access issues for the non-coordinating node due to, for example, interference on a particular communication channel.

FIG. 4B is a conceptual diagram of a long-term-sensing-based coexistence framework. The gNB, which may correspond to base station 102, may include a long term sensing measurements component 432 for obtaining the long term sensing measurements 246. The long term sensing measurements 246 may be used by the non-coordinating node determination component 248 to determine or otherwise identify a presence of an affected non-coordinating node. Upon identifying or otherwise determining that the presence of a non-coordinating node, the base station 102 may transmit a decision of remedial action 250 to, for example, the UE 104 or via backhaul to other network entities, or over the air to other entities such as the non-coordinating node.

The UE 104 may include a long term sensing measurements component 434 for obtaining the long term sensing measurements 246. The long term sensing measurements 246 may be used by the non-coordinating node determination component 348 to determine or otherwise identify a presence of an affected non-coordinating node. The UE 104 may then transmit an inference report 438 indicating the presence of the affected non-coordinating node or lack thereof to the base station 102.

In some aspects, detection of interference impact on the non-coordinating node may include at least one measurement of a transmission from that non-coordinating node (e.g., a victim UE belonging to another operator) or transmission from another non-coordinating node (e.g., a gNB serving the victim UE belonging to the other operator). For example, this may represent a situation where a complaint made by victim or on behalf of victim is heard during the sensing period. The signal strength or received power of the complaint may represent the size of the interference impact on the victim. The transmit signal power for such complaint may be chosen to represent the interference impact on the non-coordinating victim.

FIG. 4C is a flow diagram for UE assistance for long term sensing 450. At 452, the gNB or base station 102 may transmit a long term sensing measurement configuration message to the UE 104 via RRC. At 454, the UE 104 may perform long term sensing measurements. At 456 the UE 104 may transmit a long term sensing report to the base station 102. At 458, the UE 104 may perform a long-term-sensing-based inference so as to determine if the UE 104 is an aggressor or victim of the non-coordinating node.

For example, when the UE 104 is a receiver, and transmissions from non-coordinating nodes are received at a strength larger than a threshold, the UE 104 may be deemed a victim. On the other hand, based on a transmit power and beamforming of the UE 104, and assessment of path gain with the non-coordinating node based on long term measurements, a determination may be made whether the UE 104 is an aggressor to the non-coordinating node's reception.

At 460, the UE 104 transmit a long-term-sensing-based report including the results of the long-term-sensing-based inference made at 458. At 462, the base station 102 may determine or otherwise identify a remedial action such as channel selection in response to receiving the long-term-sensing-based report from the UE 104. At 464, the base station 102 may send the remedial action to all serving nodes.

FIG. 5 is a flowchart of an example method 500 of wireless communication at an apparatus of a UE. In an example, a UE, such as the UE 104 depicted and described in FIGS. 1, 3, 4B and 7, or components thereof, can perform the functions described in method 500.

At block 502, the method 500 may receive, from a network entity, a sensing measurement configuration message. In some aspects, the communicating component 342, such as in conjunction with processor(s) 312, memory 316, or transceiver 302, may be configured to receive, from a network entity, a sensing measurement configuration message. Thus, the UE 104, the processor(s) 312, the communicating component 342 or one of its subcomponents may define the means for receiving, from a network entity, a sensing measurement configuration message.

At block 504, the method 500 may transmit, to the network entity, a long-term-sensing-based report including the at least one long term sensing measurement obtained during a sensing period at the UE and associated with at least one non-coordinating node that forgoes coordination with a node within a coverage area, the long-term-sensing-based report indicating an interference impact on the at least one non-coordinating node. In some aspects, the communicating component 342, such as in conjunction with processor(s) 312, memory 316, or transceiver 302, may be configured to transmit, to the network entity, a long-term-sensing-based report including the at least one long term sensing measurement obtained during a sensing period at the UE and associated with at least one non-coordinating node that forgoes coordination with a node within a coverage area, the long-term-sensing-based report indicating an interference impact on the at least one non-coordinating node. Thus, the UE 104, the processor(s) 312, the communicating component 342 or one of its subcomponents may define the means for transmitting, to the network entity, a long-term-sensing-based report including the at least one long term sensing measurement obtained during a sensing period at the UE and associated with at least one non-coordinating node that forgoes coordination with a node within a coverage area, the long-term-sensing-based report indicating an interference impact on the at least one non-coordinating node.

In some aspects, the network entity may be associated with a first network, and the at least one long term sensing measurement corresponds to at least one of a PLMN identifier of a second network different than the first network, an operating channel bandwidth of the second network, a frequency range of the second network, system information of the second network, or RRC measurements.

In some aspects, the at least one long term sensing measurement is obtained according to QCL information or receiver spatial filter information.

In some aspects, obtaining the at least one long term sensing measurement may include measuring an energy level of a communication channel.

In some aspects, the energy level may be measured using a configured beam associated with QCL or receiver spatial filter information.

In some aspects, transmitting the long-term-sensing-based report may include measuring a beacon of a wireless WLAN node corresponding to a non-coordinating node, wherein measuring the beacon includes decoding and reading a content of the beacon, identifying a bandwidth of a communication channel associated with the WLAN node or a relative signal strength of the communication channel associated with the WLAN node, where the bandwidth and the signal strength are associated with the at least one long term sensing measurement.

In some aspects, the long term sensing report may include an indication of a beam associated with obtaining the at least one long term sensing measurement.

At block 506, the method 500 may transmit, to the network entity, the long-term-sensing-based report includes transmitting an indication that the at least one non-coordinating node satisfies a communication degradation threshold associated with medium access interference experienced by the at least one non-coordinating node based on the at least one long term sensing measurement. In some aspects, the communicating component 342, such as in conjunction with processor(s) 312, memory 316, or transceiver 302, may be configured to transmit, to the network entity, the long-term-sensing-based report includes transmitting an indication that the at least one non-coordinating node satisfies a communication degradation threshold associated with medium access interference experienced by the at least one non-coordinating node based on the at least one long term sensing measurement. Thus, the UE 104, the processor(s) 312, the communicating component 342 or one of its subcomponents may define the means for transmitting, to the network entity, the long-term-sensing-based report includes transmitting an indication that the at least one non-coordinating node satisfies a communication degradation threshold associated with medium access interference experienced by the at least one non-coordinating node based on the at least one long term sensing measurement.

In some aspects, the at least one non-coordinating node may correspond to a different network entity that operates according to a different radio access technology or distinct technology type, or is associated with a different operator than the network entity.

At block 508, the method 500 may receive, from the network entity, an indication of a remedial action. In some aspects, the communicating component 342, such as in conjunction with processor(s) 312, memory 316, or transceiver 302, may be configured to receive, from the network entity such as base station 102, an indication of a remedial action 250. Thus, the UE 104, the processor(s) 312, the communicating component 342 or one of its subcomponents may define the means for receiving, from the network entity, an indication of a remedial action.

In some aspects, the method 500 may include receiving, from the network entity, a request to obtain the at least one long term sensing measurement while in a RRC connected state, wherein the at least one long term sensing measurement is obtained while in the RRC connected state.

In some aspects, the method 500 may include maintaining transmission samples measured during the sensing period associated with obtaining the at least one long term sensing measurement, and identifying a WLAN preamble for offline processing based on the samples of transmissions.

In some aspects, the transmission samples are obtained according to QCL information or receiver spatial filter information, and wherein the long term sensing report further includes a beam associated with obtaining the at least one long term sensing measurement.

In some aspects, the detection of interference impact on the at least one non-coordinating node may include a measurement of a transmission from the at least one non-coordinating node or a transmission from another non-coordinating node.

Figure 6A:
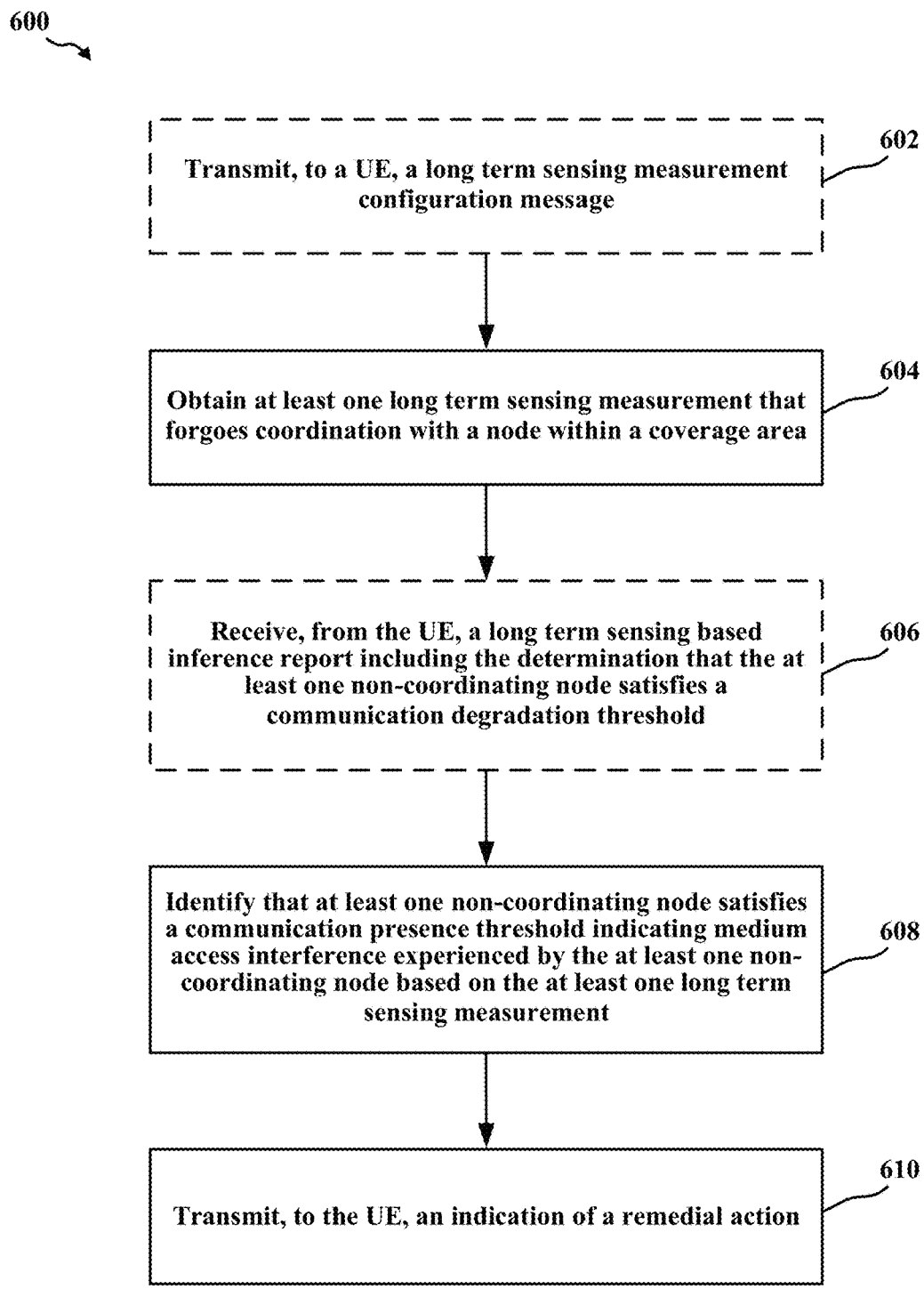
FIG. 6A is a flowchart of an example method of wireless communication at an apparatus of a network entity that supports coexistence between coordinating and non-coordinating nodes in high frequency bands.

FIG. 6A is a flowchart of another example method 600 for wireless communication at an apparatus of a network entity. In an example, a base station, such as the BS 102 depicted and described in FIGS. 1, 2, 4B, and 7, or components thereof, can perform the functions described in method 600.

At block 602, the method 600 may transmit, to the UE, a long term sensing measurement configuration message. In some aspects, the communicating component 242, such as in conjunction with processor(s) 212, memory 216, or transceiver 202, may be configured to transmitting, to the UE, a long term sensing measurement configuration message. Thus, the base station 102, the processor(s) 212, the communicating component 242 or one of its subcomponents may define the means for transmitting, to the UE, a long term sensing measurement configuration message.

At block 604, the method 600 may obtain at least one long term sensing measurement associated with at least one non-coordinating node that forgoes coordination with a node within a coverage area. In some aspects, the communicating component 242, such as in conjunction with processor(s) 212, memory 216, or transceiver 202, may be configured to obtain at least one long term sensing measurement associated with at least one non-coordinating node that forgoes coordination with a node within a coverage area. Thus, the base station 102, the processor(s) 212, the communicating component 242 or one of its subcomponents may define the means for obtaining at least one long term sensing measurement associated with at least one non-coordinating node that forgoes coordination with a node within a coverage area.

In some aspects, obtaining the at least one long term sensing measurement may include receiving, from the UE, a long term sensing report including the at least one long term sensing measurement.

In some aspects, the network entity may be associated with a first network, and the at least one long term sensing measurement may correspond to at least one of a PLMN identifier of a second network different than the first network, an operating channel bandwidth of the second network, a frequency range of the second network, system information of the second network, or a RRC measurements.

At block 606, the method 600 may receive, from the UE, a long-term-sensing-based report including the identification that the at least one non-coordinating node satisfies a communication degradation threshold. In some aspects, the communicating component 242, such as in conjunction with processor(s) 212, memory 216, or transceiver 202, may be configured to receive, from the UE, a long-term-sensing-based report including the identification that the at least one non-coordinating node satisfies a communication degradation threshold. Thus, the base station 102, the processor(s) 212, the communicating component 242 or one of its subcomponents may define the means for receiving, from the UE, a long-term-sensing-based report including the identification that the at least one non-coordinating node satisfies a communication degradation threshold.

In some aspects, the at least one non-coordinating node may correspond to a different network entity that operates according to a different radio access technology or distinct technology type, or is associated with a different operator than the network entity.

At block 608, the method 600 may identify that the at least one non-coordinating node satisfies a communication presence threshold indicating medium access interference experienced by the at least one non-coordinating node based on the at least one long term sensing measurement. In some aspects, the communicating component 242, such as in conjunction with processor(s) 212, memory 216, or transceiver 202, may be configured to identify that the at least one non-coordinating node satisfies a communication presence threshold indicating medium access interference experienced by the at least one non-coordinating node based on the at least one long term sensing measurement. Thus, the base station 102, the processor(s) 212, the communicating component 242 or one of its subcomponents may define the means for identifying that the at least one non-coordinating node satisfies a communication presence threshold indicating medium access interference experienced by the at least one non-coordinating node based on the at least one long term sensing measurement.

At block 610, the method 600 may transmit, to a UE, an indication of a remedial action. In some aspects, the communicating component 242, such as in conjunction with processor(s) 212, memory 216, or transceiver 202, may be configured to transmit, to a UE, an indication of a remedial action. Thus, the base station 102, the processor(s) 212, the communicating component 242 or one of its subcomponents may define the means for transmitting, to a UE, an indication of a remedial action.

In some aspects, the method 600 may include transmitting, to the UE, a request to obtain the at least one long term sensing measurement while in a RRC connected state.

In some aspects, the method 600 may include receiving an indication of a beam used by the UE to obtain the at least one long term sensing measurement.

In some aspects, obtaining the at least one long term sensing measurement includes measuring an energy level of a communication channel, and wherein the energy level is measured using a configured beam associated with QCL or receiver spatial filter information.

In some aspects, the at least one non-coordinating node may correspond to a WLAN node, and obtaining the at least one long term sensing measurement during the sensing period may include measuring a beacon associated with the WLAN node, identifying a bandwidth of a communication channel associated with the WLAN node or a relative signal strength of the communication channel associated with the WLAN node, where the bandwidth and the signal strength are associated with the at least one long term sensing measurement.

In some aspects, maintaining transmission samples measured during the sensing period associated with obtaining the at least one long term sensing measurement, and identifying a WLAN preamble for offline processing based on the samples of transmissions, where the remedial action is received based on identifying the WLAN preamble.

In some aspects, the transmission samples are obtained according to QCL information or receiver spatial filter information, and wherein the long term sensing report further includes a beam associated with obtaining the at least one long term sensing measurement.

Figure 6B:
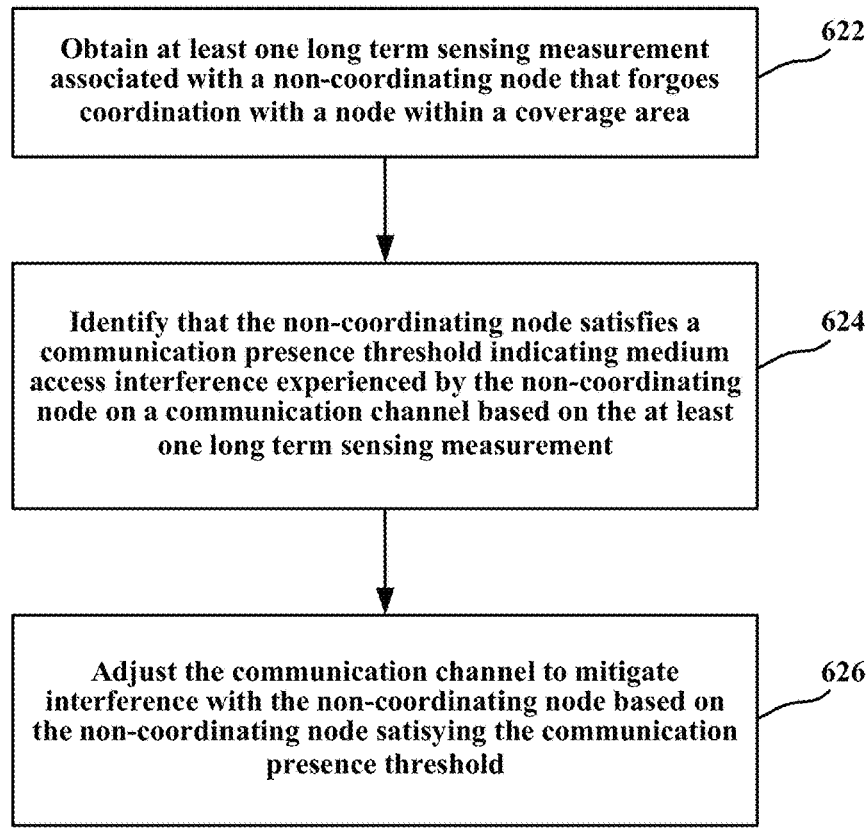
FIG. 6B is a flowchart of another example method of wireless communication at an apparatus of a network entity that supports coexistence between coordinating and non-coordinating nodes in high frequency bands.

FIG. 6B is a flowchart of another example method 600 for wireless communication at an apparatus of a network entity. In an example, a base station, such as the BS 102 depicted and described in FIGS. 1, 2 and 7, or components thereof, can perform the functions described in method 600.

At block 622, the method 600 may obtain at least one long term sensing measurement associated with a non-coordinating node that forgoes coordination with a node within a coverage area. In some aspects, the communicating component 242, such as in conjunction with processor(s) 212, memory 216, or transceiver 202, may be configured to obtain at least one long term sensing measurement associated with a non-coordinating node that forgoes coordination with at least one node within an overlapping or adjacent coverage area as the network entity. Thus, the base station 102, the processor(s) 212, the communicating component 242 or one of its subcomponents may define the means for obtaining at least one long term sensing measurement associated with a non-coordinating node that forgoes coordination with at least one proximate node having a coverage area that is adjacent, within, or overlapping a coverage area of the network entity.

At block 624, the method 600 may identify that the non-coordinating node satisfies a communication presence threshold indicating medium access interference experienced by the non-coordinating node on a communication channel based on the at least one long term sensing measurement, where satisfaction of the communication presence threshold indicates a modified access of a communication channel for the non-coordinating node. In some aspects, the communicating component 242, such as in conjunction with processor(s) 212, memory 216, or transceiver 202, may be configured to identify that the non-coordinating node satisfies a communication presence threshold indicating medium access interference experienced by the non-coordinating node on a communication channel based on the at least one long term sensing measurement, where satisfaction of the communication presence threshold indicates a modified access of a communication channel for the non-coordinating node. Thus, the base station 102, the processor(s) 212, the communicating component 242 or one of its subcomponents may define the means for identifying that the non-coordinating node satisfies a communication presence threshold indicating medium access interference experienced by the non-coordinating node on a communication channel based on the at least one long term sensing measurement, where satisfaction of the communication presence threshold indicates a modified access of a communication channel for the non-coordinating node.

At block 626, the method 600 may adjust the communication channel to mitigate interference with the non-coordinating node based on the non-coordinating node satisfying the communication presence threshold. In some aspects, the communicating component 242, such as in conjunction with processor(s) 212, memory 216, or transceiver 202, may be configured to adjust the communication channel to mitigate interference with the non-coordinating node based on the non-coordinating node satisfying the communication presence threshold. Thus, the base station 102, the processor(s) 212, the communicating component 242 or one of its subcomponents may define the means for adjusting the communication channel to mitigate interference with the non-coordinating node based on the non-coordinating node satisfying the communication presence threshold.

In some aspects, adjusting the communication channel includes selecting a different communication channel, the method 620 further comprising transmitting a message to a UE to switch to the different communication channel.

In some aspects, identifying a bandwidth or a set of frequencies occupied by the non-coordinating node, where adjusting the communication channel may include selecting a different communication channel that does not overlap with the bandwidth or the set of frequencies.

In some aspects, adjusting the communication channel may include deactivating operation in a carrier interfering with the non-coordinating node.

In some aspects, the method 620 may include identifying at least one beam interfering with the non-coordinating node, where adjusting the communication channel includes deactivating a SSB associated with the least one beam.

In some aspects, the method 620 may include identifying a BWP of a transmission resulting in interference with the non-coordinating node, where adjusting the communication channel includes adjusting an active BWP for a UE, or removing the BWP from a set of configured BWPs for the UE.

In some aspects, identifying a bandwidth occupied by the non-coordinating node, where adjusting the communication channel includes adjusting an active BWP to be outside the bandwidth, or removing a BWP that overlaps with the bandwidth or set of frequencies from a configured set of BWPs for a UE.

In some aspects, the medium access interference experienced by the non-coordinating node may include a measurement of a transmission from the at least one non-coordinating node or a transmission from another non-coordinating node.

Figure 7:
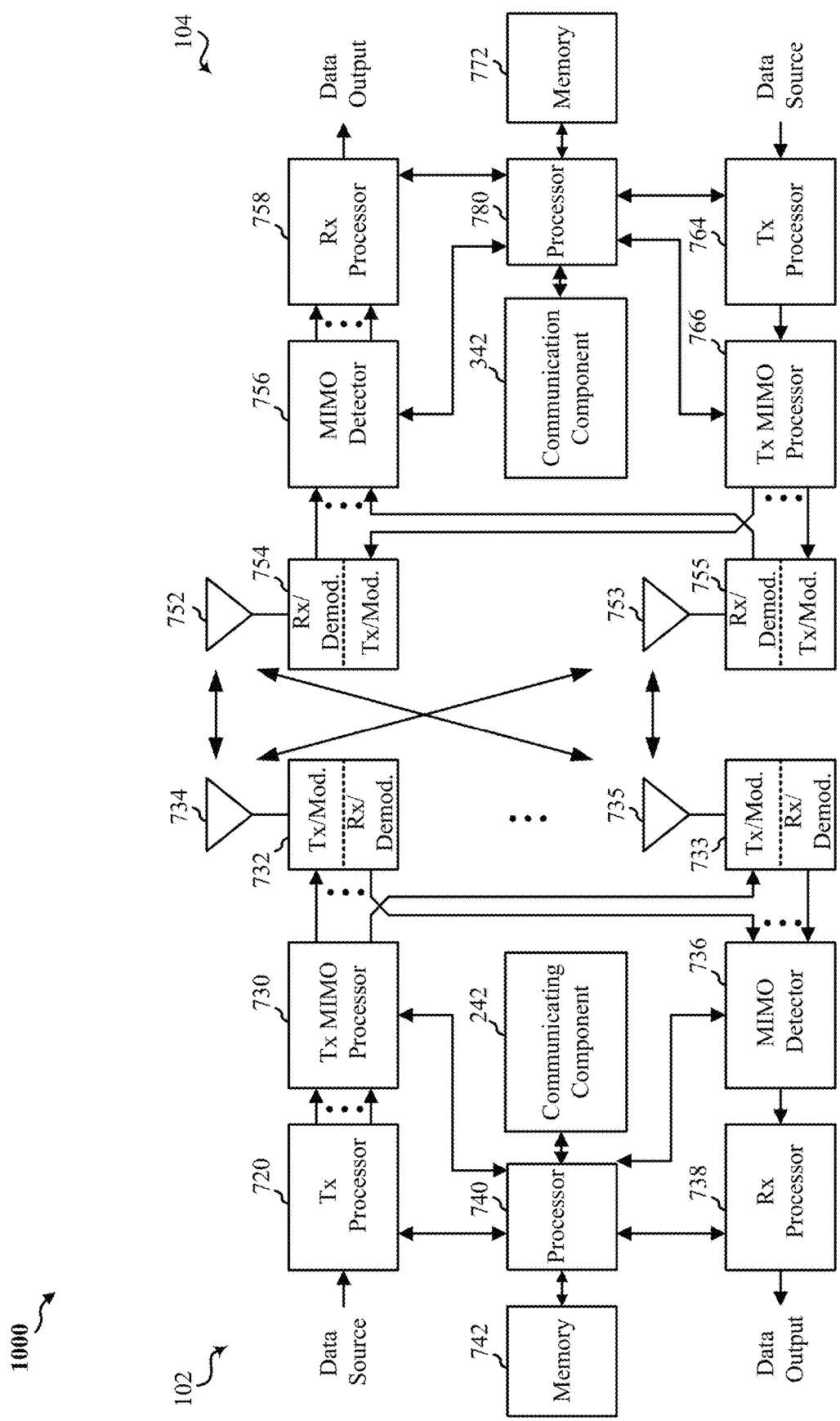
FIG. 7 is a block diagram illustrating an example of a multiple-input and multiple-output (MIMO) communication system including a base station (BS) and a UE that supports coexistence between coordinating and non-coordinating nodes.

FIG. 7 is a block diagram of a MIMO communication system 700 including a base station 102 (such as the base station 102 depicted and described in FIGS. 1, 2 and 7) and a UE 104 (such as the UE 104 depicted and described in FIGS. 1, 3 and 7). The MIMO communication system 700 may be configured to provide long-term-sensing-based inter-operator coexistence techniques for unlicensed high bands providing a measurement framework and candidate measurements, along with channel selection, per beam channel deselection, and dynamic frequency selection, described herein. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 also may generate control symbols or reference symbols. A transmit MIMO processor 730 may perform spatial processing (such as precoding) on data symbols, control symbols, or reference symbols, if applicable, and may provide output symbol streams to the transmit modulator/demodulators 732 and 733. Each modulator/demodulator 732 through 733 may process a respective output symbol stream (such as for OFDM, etc.) to obtain an output sample stream. Each modulator/demodulator 732 through 733 may further process (such as convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1 and 2. At the UE 104, the UE antennas 752 and 753 may receive the DL signals from the base station 102 and may provide the received signals to the modulator/demodulators 754 and 755, respectively. Each modulator/demodulator 754 through 755 may condition (such as filter, amplify, downconvert, and digitize) a respective received signal to obtain input samples. Each modulator/demodulator 754 through 755 may further process the input samples (such as for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (such as demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (such as FIGS. 1 and 2). The processor 720 may in some cases execute stored instructions to instantiate a communicating component 342 (such as FIGS. 1 and 3).

On the uplink (UL), at the UE 104, a transmit processor 764 may receive and process data from a data source. The transmit processor 764 also may generate reference symbols for a reference signal. The symbols from the transmit processor 764 may be precoded by a transmit MIMO processor 766 if applicable, further processed by the modulator/demodulators 754 and 755 (such as for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

Some Additional Examples

The aspects described herein additionally include one or more of the following aspect examples described in the following numbered clauses.

1. A method of wireless communication at a user equipment (UE), comprising:
   receiving, from a network entity, a sensing measurement configuration message;
   transmitting, to the network entity, a long-term-sensing-based report including the at least one long term sensing measurement obtained during a sensing period at the UE and associated with at least one non-coordinating node that forgoes coordination with a node within a coverage area, the long-term-sensing-based report indicating an interference impact on the at least one non-coordinating node; and receiving, from the network entity, an indication of a remedial action.
2. The method of clause 1, further comprising:
   transmitting, to the network entity, the long-term-sensing-based report includes transmitting an indication that the at least one non-coordinating node satisfies a communication degradation threshold associated with medium access interference experienced by the at least one non-coordinating node based on the at least one long term sensing measurement.
3. The method of any of clause 1 to clause 2, wherein the at least one non-coordinating node corresponds to a different network entity that operates according to a different radio access technology or distinct technology type, or is associated with a different operator than the network entity.
4. The method of any of clause 1 to clause 3, wherein the network entity is associated with a first network, and wherein the at least one long term sensing measurement corresponds to at least one of:
   a public local mobile network (PLMN) identifier of a second network different than the first network,
   an operating channel bandwidth of the second network,
   a frequency range of the second network,
   system information of the second network, or
   radio resource control (RRC) measurements.
5. The method of any of clause 1 to clause 4, further comprising receiving, from the network entity, a request to obtain the at least one long term sensing measurement while in a radio resource control (RRC) connected state, wherein the at least one long term sensing measurement is obtained while in the RRC connected state.
6. The method of any of clause 1 to clause 5, wherein the at least one long term sensing measurement is obtained according to quasi-co-location (QCL) information or receiver spatial filter information.
7. The method of any of clause 1 to clause 6, wherein the long-term-sensing-based report further includes an indication of a beam associated with obtaining the at least one long term sensing measurement.
8. The method of any of clause 1 to clause 7, wherein obtaining the at least one long term sensing measurement includes measuring an energy level of a communication channel.
9. The method of any of clause 1 to clause 8, wherein the energy level is measured using a configured beam associated with quasi-co-location (QCL) or receiver spatial filter information.
10. The method of any of clause 1 to clause 9, wherein transmitting the long-term-sensing-based-report includes:
    measuring a beacon of a wireless local area network (WLAN) node corresponding to a non-coordinating node, wherein measuring the beacon includes decoding and reading a content of the beacon,
    identifying a bandwidth of a communication channel associated with the WLAN node identifying a relative signal strength of the communication channel associated with the WLAN node, wherein the bandwidth and the signal strength are associated with the at least one long term sensing measurement.
11. The method of any of clause 1 to clause 10, further comprising:
    maintaining transmission samples measured during the sensing period associated with obtaining the at least one long term sensing measurement; and
    identifying a WLAN preamble for offline processing based on the samples of transmissions.

12. The method of any of clause 1 to clause 11, wherein the transmission samples are obtained according to quasi-co-location (QCL) information or receiver spatial filter information, and wherein the long-term-sensing-based report further includes a beam associated with obtaining the at least one long term sensing measurement.
13. The method of any of clause 1 to clause 12, wherein the detection of interference impact on the at least one non-coordinating node includes a measurement of a transmission from the at least one non-coordinating node or a transmission from another non-coordinating node, where the remedial action is received based on identifying the WLAN preamble.
14. A method of wireless communication at a network entity, comprising:
obtaining at least one long term sensing measurement associated with at least one non-coordinating node that forgoes coordination with a node within a coverage area;
identifying that the at least one non-coordinating node satisfies a communication presence threshold indicating medium access interference experienced by the at least one non-coordinating node based on the at least one long term sensing measurement; and
transmitting, to a user equipment (UE), an indication of a remedial action 15.

The method of clause 14, further comprising receiving, from the UE, a long-term-sensing-based report including the identification that the at least one non-coordinating node satisfies a communication degradation threshold, the long-term-sensing-based report represents a detection of interference impact on the at least one non-coordinating node associated with a frequency range.

16. The method of any of clause 14 to clause 15, further comprising transmitting, to the UE, a long term sensing measurement configuration message, wherein obtaining the at least one long term sensing measurement includes receiving, from the UE, a long-term-sensing-based report including the at least one long term sensing measurement.
17. The method of any of clause 14 to clause 16, wherein the at least one non-coordinating node corresponds to a different network entity that operates according to a different radio access technology or distinct technology type, or is associated with a different operator than the network entity.
18. The method of any of clause 14 to clause 17, wherein the network entity is associated with a first network, and wherein the at least one long term sensing measurement corresponds to at least one of:
a public local mobile network (PLMN) identifier of a second network different than the first network,
an operating channel bandwidth of the second network,
a frequency range of the second network,
system information of the second network, or
radio resource control (RRC) measurements.
19. The method of any of clause 14 to clause 18, further comprising transmitting, to the UE, a request to obtain the at least one long term sensing measurement while in a radio resource control (RRC) connected state.
20. The method of any of clause 14 to clause 19, further comprising receiving an indication of a beam used by the UE to obtain the at least one long term sensing measurement.
21. The method of any of clause 14 to clause 20, wherein obtaining the at least one long term sensing measurement includes measuring an energy level of a communication channel, and wherein the energy level is measured using a configured beam associated with quasi-co-location (QCL) or receiver spatial filter information.
22. The method of any of clause 14 to clause 21, wherein the at least one non-coordinating node corresponds to a wireless local area network (WLAN) node, and wherein obtaining the at least one long term sensing measurement includes:
measuring a beacon associated with the WLAN node,
identifying a bandwidth of a communication channel associated with the WLAN node or a relative signal strength of the communication channel associated with the WLAN node, where the bandwidth and the signal strength are associated with the at least one long term sensing measurement.
23. The method of any of clause 14 to clause 22, further comprising:
maintaining transmission samples measured during a sensing period associated with obtaining the at least one long term sensing measurement; and
identifying a WLAN preamble for offline processing based on the samples of transmissions, where the remedial action is received based on identifying the WLAN preamble.
24. The method of any of clause 14 to clause 23, wherein the transmission samples are obtained according to quasi-co-location (QCL) information or receiver spatial filter information.
25. An apparatus for wireless communication, comprising a transceiver; a memory configured to store instructions; and at least one processor communicatively coupled with the transceiver and the memory, wherein the at least one processor is configured to perform the operations of the method of any of clause 1 to clause 13.
26. An apparatus for wireless communication, comprising means for performing the operations of the method of any of clause 1 to clause 13.
27. A non-transitory computer-readable medium, comprising code executable by one or more processors to perform the operations of the method of any of clause 1 to clause 13.
28. An apparatus for wireless communication, comprising a transceiver; a memory configured to store instructions; and at least one processor communicatively coupled with the transceiver and the memory, wherein the at least one processor is configured to perform the operations of the method of any of clause 14 to clause 24.
29. An apparatus for wireless communication, comprising means for performing the operations of the method of any of clause 14 to clause 24.
30. A non-transitory computer-readable medium, comprising code executable by one or more processors to perform the operations of the method of any of clause 14 to clause 24.
31. A method of wireless communication at a network entity, comprising:
obtaining at least one long term sensing measurement associated with a non-coordinating node that forgoes coordination with a node within a coverage area;
identifying that the non-coordinating node satisfies a communication presence threshold indicating medium access interference experienced by the non-coordinating node on a communication channel based on the at least one long term sensing measurement; and adjusting the communication channel to mitigate interference with the non-coordinating node based on the non-coordinating node satisfying the communication presence threshold.

32. The method of clause 31, wherein adjusting the communication channel includes selecting a different communication channel, the method further comprising:
transmitting a message to a user equipment (UE) to switch to the different communication channel.

33. The method of any of clause 31 to clause 32, further comprising determining a bandwidth or a set of frequencies occupied by the non-coordinating node,
wherein adjusting the communication channel includes selecting a different communication channel that does not overlap with the bandwidth or the set of frequencies.

34. The method of any of clause 31 to clause 33, wherein adjusting the communication channel includes deactivating operation in a carrier interfering with the non-coordinating node.

35. The method of any of clause 31 to clause 34, further comprising identifying at least one beam interfering with the non-coordinating node, wherein adjusting the communication channel includes deactivating a synchronization signal block (SSB) associated with the least one beam.

36. The method of any of clause 31 to clause 35, further comprising identifying a bandwidth part (BWP) of a transmission resulting in interference with the non-coordinating node,
wherein adjusting the communication channel includes:
adjusting an active BWP for a user equipment (UE), or
removing the BWP from a set of configured BWPs for the UE.

37. The method of any of clause 31 to clause 36, further comprising identifying a bandwidth occupied by the non-coordinating node,
wherein adjusting the communication channel includes:
adjusting an active bandwidth part (BWP) to be outside the bandwidth, or
removing a BWP that overlaps with the bandwidth or set of frequencies from a configured set of BWPs for a user equipment (UE).

38. The method of any of clause 31 to clause 37, wherein the medium access interference experienced by the non-coordinating node includes a measurement of a transmission from the at least one non-coordinating node or a transmission from another non-coordinating node.

39. An apparatus for wireless communication, comprising a transceiver; a memory configured to store instructions; and at least one processor communicatively coupled with the transceiver and the memory, wherein the at least one processor is configured to perform the operations of the method of any of clause 31 to clause 38.

40. An apparatus for wireless communication, comprising means for performing the operations of the method of any of clause 31 to clause 38.

41. A non-transitory computer-readable medium, comprising code executable by one or more processors to perform the operations of the method of any of clause 31 to clause 38.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single implementation. Conversely, various features that are described in the context of a single implementation also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication at a user equipment (UE), comprising:
   receiving, from a network entity, a sensing measurement configuration message;
   transmitting, to the network entity, a long-term-sensing-based report including the at least one long term sensing measurement obtained during a sensing period at the UE and associated with at least one non-coordinating node that forgoes coordination with a node within a coverage area, the long-term-sensing-based report indicating an interference impact on the at least one non-coordinating node, wherein transmitting the long term sensing report includes:
      measuring a beacon of the non-coordinating node corresponding to a wireless local area network (WLAN) node while in a connected state with the network entity, and
      identifying, based on the beacon, a bandwidth of a communication channel associated with the WLAN node or a relative signal strength of the communication channel associated with the WLAN node, wherein the bandwidth and the signal strength are associated with the at least one long term sensing measurement;
   maintaining transmission samples measured during the sensing period associated with obtaining the at least one long term sensing measurement;
   identifying a WLAN preamble based on the samples of transmissions; and
   receiving, from the network entity, an indication of a remedial action, wherein the remedial action is received based on identifying the WLAN preamble.

2. The method of claim 1, further comprising:
   transmitting, to the network entity, the long-term-sensing-based report includes transmitting an indication that the at least one non-coordinating node satisfies a communication degradation threshold associated with medium access interference experienced by the at least one non-coordinating node based on the at least one long term sensing measurement.

3. The method of claim 2, wherein the at least one non-coordinating node corresponds to a different network entity that operates according to a different radio access technology or distinct technology type, or is associated with a different operator than the network entity.

4. The method of claim 1, wherein the network entity is associated with a first network, and wherein the at least one long term sensing measurement corresponds to at least one of:
   a public local mobile network (PLMN) identifier of a second network different than the first network,
   an operating channel bandwidth of the second network,
   a frequency range of the second network,
   system information of the second network, or
   radio resource control (RRC) measurements.

5. The method of claim 1, further comprising receiving, from the network entity, a request to obtain the at least one long term sensing measurement while in a radio resource control (RRC) connected state, wherein the at least one long term sensing measurement is obtained while in the RRC connected state.

6. The method of claim 1, wherein the at least one long term sensing measurement is obtained according to quasi-co-location (QCL) information or receiver spatial filter information.

7. The method of claim 6, wherein the long-term-sensing-based report further includes an indication of a beam associated with obtaining the at least one long term sensing measurement.

8. The method of claim 1, wherein obtaining the at least one long term sensing measurement includes measuring an energy level of a communication channel.

9. The method of claim 8, wherein the energy level is measured using a configured beam associated with quasi-co-location (QCL) or receiver spatial filter information.

10. The method of claim 1, wherein measuring the beacon includes decoding and reading a content of the beacon.

11. The method of claim 1, wherein the transmission samples are obtained according to quasi-co-location (QCL) information or receiver spatial filter information, and wherein the long-term-sensing-based report further indicates a beam associated with obtaining the at least one long term sensing measurement.

12. The method of claim 1, wherein the detection of interference impact on the at least one non-coordinating node includes a measurement of a transmission from the at least one non-coordinating node or a transmission from another non-coordinating node.

13. A method of wireless communication at a network entity, comprising:
  obtaining at least one long term sensing measurement associated with at least one non-coordinating node corresponding to a wireless local area network (WLAN) node that forgoes coordination with a node within a coverage area, wherein obtaining the at least one long term sensing measurement includes:
    measuring a beacon associated with the WLAN node, identifying a bandwidth of a communication channel associated with the WLAN node or a relative signal strength of the communication channel associated with the WLAN node;
  identifying that the at least one non-coordinating node satisfies a communication presence threshold indicating medium access interference experienced by the at least one non-coordinating node based on the at least one long term sensing measurement;
  maintaining transmission samples measured during a sensing period associated with obtaining the at least one long term sensing measurement;
  identifying a WLAN preamble based on the samples of transmissions; and
  transmitting, to a user equipment (UE), an indication of a remedial action, wherein the remedial action is received based on identifying the WLAN preamble.

14. The method of claim 13, further comprising receiving, from the UE, a long-term-sensing-based report including the identification that the at least one non-coordinating node satisfies a communication degradation threshold, the long-term-sensing-based report represents a detection of interference impact on the at least one non-coordinating node associated with a frequency range.

15. The method of claim 13, further comprising transmitting, to the UE, a long term sensing measurement configuration message, wherein obtaining the at least one long term sensing measurement includes receiving, from the UE, a long-term-sensing-based report including the at least one long term sensing measurement.

16. The method of claim 13, wherein the at least one non-coordinating node corresponds to a different network entity that operates according to a different radio access technology or distinct technology type, or is associated with a different operator than the network entity.

17. The method of claim 13, wherein the network entity is associated with a first network, and wherein the at least one long term sensing measurement corresponds to at least one of:
  a public local mobile network (PLN) identifier of a second network different than the first network,
  an operating channel bandwidth of the second network,
  a frequency range of the second network,
  system information of the second network, or
  radio resource control (RRC) measurements.

18. The method of claim 13, further comprising transmitting, to the UE, a request to obtain the at least one long term sensing measurement while in a radio resource control (RRC) connected state.

19. The method of claim 13, further comprising receiving an indication of a beam used by the UE to obtain the at least one long term sensing measurement.

20. The method of claim 13, wherein obtaining the at least one long term sensing measurement includes measuring an energy level of a communication channel, and wherein the energy level is measured using a configured beam associated with quasi-co-location (QCL) or receiver spatial filter information.

21. The method of claim 13, wherein the bandwidth and the signal strength are associated with the at least one long term sensing measurement.

22. The method of claim 13, wherein the transmission samples are obtained according to quasi-co-location (QCL) information or receiver spatial filter information.

23. An apparatus for wireless communication, comprising:
  a transceiver;
  one or more memories, individually or in combination, having instructions; and
  one or more processors each coupled to at least one of the one or more memories and configured to:
    receive, from a network entity, a sensing measurement configuration message;
    transmit, to the network entity, a long-term-sensing-based report including the at least one long term sensing measurement obtained during a sensing period at the UE and associated with at least one non-coordinating node that forgoes coordination with a node within a coverage area, the long-term-sensing-based report indicating an interference impact on the at least one non-coordinating node, wherein to transmit the long term sensing report, the one or more processors are configured to:
      measure a beacon of a wireless local area network (WLAN) node corresponding to the non-coordinating node while in a connected state with the network entity,
      identify, based on the beacon, a bandwidth of a communication channel associated with the WLAN node or a relative signal strength of the communication channel associated with the WLAN node, wherein the bandwidth and the signal strength are associated with the at least one long term sensing measurement;
    maintaining transmission samples measured during the sensing period associated with obtaining the at least one long term sensing measurement; and
    identifying a WLAN preamble based on the samples of transmissions; and
    receive, from the network entity, an indication of a remedial action, wherein the remedial action is received based on identifying the WLAN preamble.

24. The apparatus of claim 23, wherein the one or more processors are further configured to:
  transmit, to the network entity, the long-term-sensing-based report includes transmitting an indication that the at least one non-coordinating node satisfies a communication degradation threshold associated with medium access interference experienced by the at least one non-coordinating node based on the at least one long term sensing measurement.

25. The apparatus of claim 23, wherein the detection of interference impact on the at least one non-coordinating node includes a measurement of a transmission from the at least one non-coordinating node or a transmission from another non-coordinating node.

26. An apparatus for wireless communication, comprising:
- a transceiver;
- one or more memories, individually or in combination, having instructions; and
- one or more processors each coupled to at least one of the one or more memories and configured to:
  - obtain at least one long term sensing measurement associated with at least one non-coordinating node corresponding to a wireless local area network (WLAN) node that forgoes coordination with a node within a coverage area;
  - identify that the at least one non-coordinating node satisfies a communication presence threshold indicating medium access interference experienced by the at least one non-coordinating node based on the at least one long term sensing measurement, wherein obtaining the at least one long term sensing measurement includes:
    - measure a beacon associated with the WLAN node,
    - identify a bandwidth of a communication channel associated with the WLAN node or a relative signal strength of the communication channel associated with the WLAN node; and
    - maintain transmission samples measured during a sensing period associated with obtaining the at least one long term sensing measurement;
  - identify a WLAN preamble based on the samples of transmissions; and
  - transmit, to a user equipment (UE), an indication of a remedial action, wherein the remedial action is received based on identifying the WLAN preamble.

27. The apparatus of claim 26, wherein the one or more processors are further configured to receive, from the UE, a long-term-sensing-based report including the identification that the at least one non-coordinating node satisfies a communication degradation threshold, the long-term-sensing-based report represents a detection of interference impact on the at least one non-coordinating node associated with a frequency range.

28. The apparatus of claim 26, wherein the one or more processors are further configured to transmit, to the UE, a long term sensing measurement configuration message, wherein to obtain the at least one long term sensing measurement, the at least one processor is further configured to receive, from the UE, a long-term-sensing-based report including the at least one long term sensing measurement.

* * * * *